United States Patent
Nguyen et al.

(10) Patent No.: US 9,787,989 B2
(45) Date of Patent: Oct. 10, 2017

(54) INTRA-CODING MODE-DEPENDENT QUANTIZATION TUNING

(71) Applicant: RESEARCH IN MOTION LIMITED, Waterloo (CA)

(72) Inventors: Nguyen Nguyen, Waterloo (CA); Dake He, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 429 days.

(21) Appl. No.: 13/914,670

(22) Filed: Jun. 11, 2013

(65) Prior Publication Data
US 2014/0362905 A1    Dec. 11, 2014

(51) Int. Cl.
| | |
|---|---|
| H04N 7/12 | (2006.01) |
| H04N 11/02 | (2006.01) |
| H04N 11/04 | (2006.01) |
| H04N 19/126 | (2014.01) |
| H04N 19/593 | (2014.01) |
| H04N 19/14 | (2014.01) |
| H04N 19/157 | (2014.01) |
| H04N 19/18 | (2014.01) |

(52) U.S. Cl.
CPC .......... H04N 19/126 (2014.11); H04N 19/14 (2014.11); H04N 19/157 (2014.11); H04N 19/18 (2014.11); H04N 19/593 (2014.11)

(58) Field of Classification Search
CPC ..... H04N 19/176; H04N 19/124; H04N 19/14
See application file for complete search history.

(56) References Cited

U.S. PATENT DOCUMENTS

| | | | |
|---|---|---|---|
| 8,009,730 B2* | 8/2011 | Zhu et al. | 375/240.02 |
| 2002/0126752 A1* | 9/2002 | Kim | H04N 19/40 375/240.03 |
| 2004/0114816 A1* | 6/2004 | Sugiyama | 382/239 |
| 2005/0058198 A1* | 3/2005 | Zhao | H04N 19/172 375/240.03 |
| 2005/0175093 A1* | 8/2005 | Haskell et al. | 375/240.03 |
| 2006/0013299 A1* | 1/2006 | Sato et al. | 375/240.03 |

(Continued)

FOREIGN PATENT DOCUMENTS

| | | |
|---|---|---|
| WO | 2012033344 | 3/2012 |
| WO | WO2012/033344 | 3/2012 |

(Continued)

OTHER PUBLICATIONS

Extended European Search Report dated Nov. 7, 2013.
(Continued)

*Primary Examiner* — Joseph Ustaris
*Assistant Examiner* — Rebecca Volentine
(74) *Attorney, Agent, or Firm* — Rowand LLP

(57) ABSTRACT

Methods of encoding and decoding video are described. The methods for encoding and decoding a picture partitioned into blocks include determining an activity rank for a block, based on a block size of the block and an intra-coding mode for the block; calculating a normalization value based on the activity rank divided by an average activity rank determined over a plurality of previously-encoded/decoded blocks; and quantizing/dequantizing a set of transform domain coefficients for the block using a quantization step size adjusted by the normalization value.

18 Claims, 8 Drawing Sheets

(56) References Cited

U.S. PATENT DOCUMENTS

| | | | |
|---|---|---|---|
| 2006/0233238 A1 | 10/2006 | Hinds | |
| 2006/0257034 A1* | 11/2006 | Gish et al. | 382/239 |
| 2007/0081589 A1* | 4/2007 | Kim | H04N 19/159 |
| | | | 375/240.03 |
| 2007/0140334 A1* | 6/2007 | Sun | H04N 19/126 |
| | | | 375/240.03 |
| 2007/0297508 A1 | 12/2007 | Kobayashi | |
| 2009/0016631 A1 | 1/2009 | Naito | |
| 2011/0249726 A1* | 10/2011 | Nguyen et al. | 375/240.03 |
| 2012/0082223 A1* | 4/2012 | Karczewicz | H04N 19/196 |
| | | | 375/240.12 |
| 2012/0177113 A1* | 7/2012 | Guo | H04N 19/593 |
| | | | 375/240.12 |
| 2012/0177118 A1* | 7/2012 | Karczewicz | H04N 19/137 |
| | | | 375/240.13 |
| 2012/0269258 A1* | 10/2012 | Yang | H04N 19/00163 |
| | | | 375/240.02 |
| 2013/0044811 A1* | 2/2013 | Kim | H04N 19/176 |
| | | | 375/240.12 |
| 2013/0121401 A1* | 5/2013 | Zheludkov | H04N 19/65 |
| | | | 375/240.02 |
| 2014/0119432 A1* | 5/2014 | Wang | H04N 19/00078 |
| | | | 375/240.2 |
| 2014/0119439 A1* | 5/2014 | Guo | H04N 19/70 |
| | | | 375/240.12 |
| 2015/0131722 A1* | 5/2015 | Guo | H04N 19/593 |
| | | | 375/240.12 |

FOREIGN PATENT DOCUMENTS

| | | |
|---|---|---|
| WO | 2012162806 | 12/2012 |
| WO | WO2012/162806 | 12/2012 |

OTHER PUBLICATIONS

Huiying et al.: "MPEG2 video parameter and no reference PSNR", dated May 6, 2009, XP030081827.

B. Bross et al., "High Efficiency Video Coding (HEVC) text specification draft 10 (for FDIS & Consent)", JCTVC-L1003, Geneva, CH, Jan. 2013.

A. Rehman and Z. Wang, "SSIM-Inspired Perceptual Video Coding for HEVC", ICME 2012, Jul. 2012.

J. Hu and J. Gibson, "Intra-Mode Indexed Nonuniform Quantization Parameter Matrices in AVC/H.264", The Thirty-Ninth Asilomar Conference on Signals, Systems and Computers, Oct. 2005.

Huiying et al., "MPEG2 Video Parameter and No Reference PSNR Estimation" Picture Coding Symposium 2009; May 6, 2009.

Extended European Search Report dated Mar. 2, 2017.

* cited by examiner

US 9,787,989 B2

INTRA-CODING MODE-DEPENDENT QUANTIZATION TUNING

FIELD

The present application generally relates to data compression and, in particular, to methods and devices for tuning the quantization of intra-coded image data dependent upon the intra-coding mode.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC).

There are a number of standards for encoding/decoding images and videos, including H.264, that use block-based coding processes. In these processes, the image or frame is divided into blocks, typically 4×4 or 8×8, although non-square blocks may be used in some cases, and the blocks are spectrally transformed into coefficients, quantized, and entropy encoded. In many cases, the data being transformed is not the actual pixel data, but is residual data following a prediction operation. In video coding, predictions can be intra, i.e. based on one or more reconstructed pixels within the same frame/image, or inter, i.e. based on reconstructed pixels of a previously-coded picture or image (also called motion prediction).

After a prediction block is generated, it is subtracted from the original block, leaving a residual block. The residual block is transformed to the frequency domain (often using DCT) to produce a block of transform domain coefficients, which are then quantized. The quantized transform domain coefficients are entropy coded and output as a bitstream of encoded data.

Most coding schemes attempt to balance distortion in a reconstructed picture with the bit rate. The quantization operation introduces distortion. With larger quantization step sizes comes larger distortion, but conversely larger quantization step sizes lead to smaller quantized coefficients and, as a result, a lower bit rate. The simplest quantizer uses the same quantization step size for all coefficients in a picture or image.

The human visual system does not have the same sensitivity to all distortion. For example, humans are more sensitive to distortion in lower frequency components than to distortion in higher frequency components. The measure of distortion most commonly used is peak signal-to-noise ratio (PSNR), which measures the mean squared error between spatial domain pixels in the reconstructed picture versus the original picture. This is not necessarily an accurate representation of human sensitivity to distortion.

Work on human perception of video distortion has led to the development of various measurements of "structural similarity" (SSIM) between an original picture and its reconstruction, which may be a better representation of human perception of error than PSNR. A structural similarity metric may take into account the mean values of the two pictures (or a window or block of pixels), the variance within each of those pictures and the covariance of those two pictures. SSIM may, therefore, be useful in making coding decisions, including the level of quantization to apply to a particular set of pixel data. Actual structural similarity metrics may be complex to calculate and may require multiple passes due to the necessity of calculating mean and variance values for a whole picture or grouping of pixels. This may introduce unacceptable delay and/or computational burden. Nonetheless, it would be advantageous to be able to adapt the quantization of coefficients to local statistics of the data.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
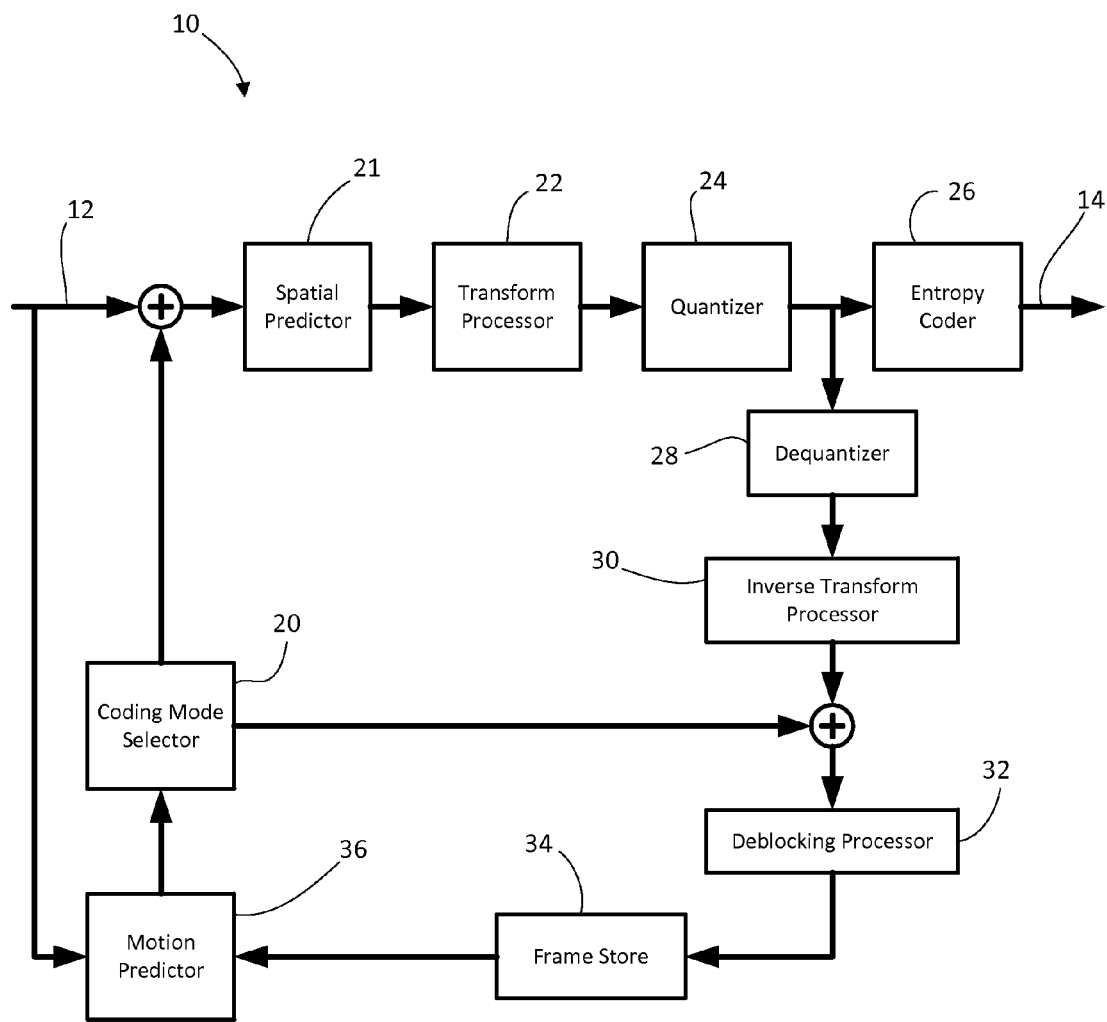
FIG. 1 shows, in block diagram form, an encoder for encoding video.

The present application describes methods and encoders/decoders for encoding and decoding video. The methods include determining an activity rank for each block based upon the intra-coding mode selected for that block and, in some cases, the block size. The activity ranks may be determined using a prescribed look-up table indexed by intra-coding mode and block size. The activity rank may be used to determine a normalization factor that is used during quantization to scale the quantization step size used for quantizing or dequantizing the coefficients of that block. The normalization factor may be determined based on the activity rank as compared to an average activity rank. In various embodiments, the average activity rank may be the average for N previous blocks, the blocks of a previous picture, or the blocks in the current picture that have been processed so far. The process may be applied at a sub-transform-block level. The block may be partitioned into regions and either different activity ranks may be determined for respective regions or one block-level activity rank may be used to determine different normalization factors for respective regions.

In a first aspect, the present application describes method of decoding video from a bitstream of encoded video using a video decoder, the video including a picture partitioned into blocks. The method includes determining an activity rank for a block, based on a block size of the block and an intra-coding mode for the block; calculating a normalization value based on the activity rank divided by an average activity rank determined over a plurality of previously-decoded blocks; and dequantizing a set of decoded quantized coefficients for the block using a quantization step size adjusted by the normalization value.

The present application further discloses a method of encoding video using a video encoder to produce a bitstream of encoded video, the video including a picture partitioned into blocks. The method includes determining an activity rank for a block, based on a block size of the block and an intra-coding mode for the block; calculating a normalization value based on the activity rank divided by an average activity rank determined over a plurality of previously-encoded blocks; and quantizing a set of transform domain coefficients for the block using a quantization step size adjusted by the normalization value.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. A series of frames/pictures may be called a "sequence" in some cases. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, transform blocks, etc., as will become apparent in light of the description below.

Figure 2:
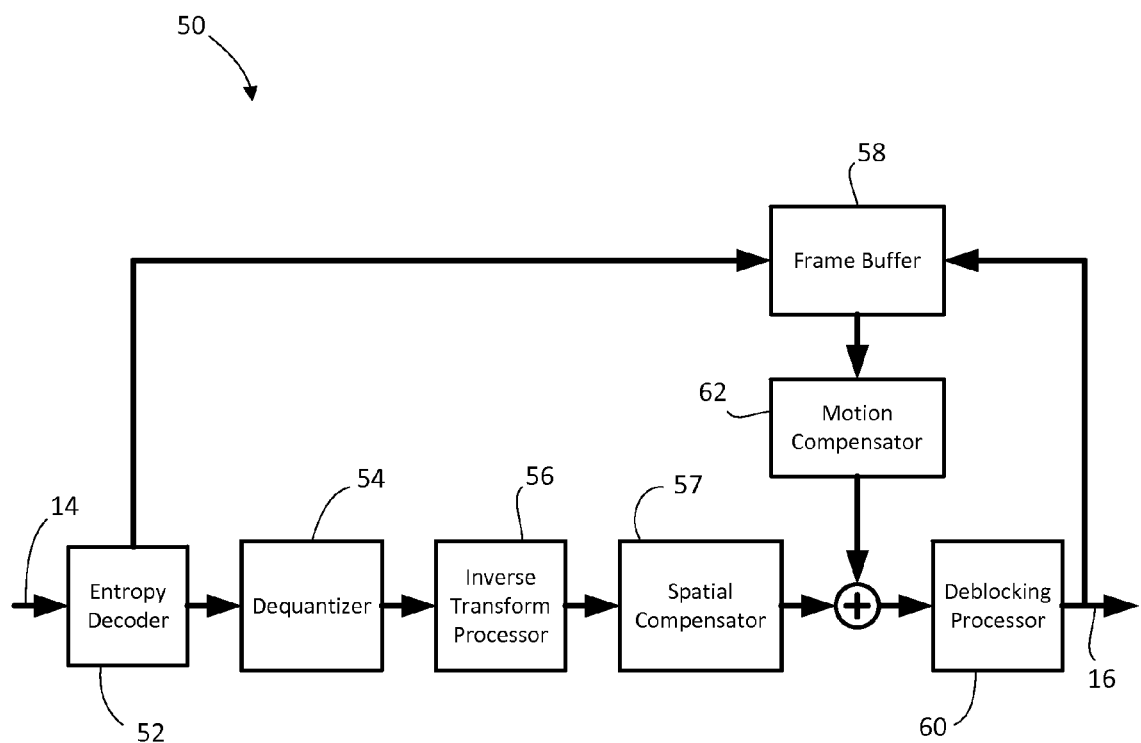
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with one or more of a number of video compression standards.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, transform blocks etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform, a wavelet transform, or others may be used in some instances. The block-based transform is performed on a transform unit. The transform unit may be the size of the coding unit, or the coding unit may be divided into multiple transform units. In the H.264 standard, for example, a typical 16×16 macroblock (coding unit) contains sixteen 4×4 transform units and the DCT process is performed on the 4×4 blocks. Transform unit (TU) may be other sizes. In some cases, the TU may be non-square, e.g. a non-square quadrature transform (NSQT). The term "transform unit" may be used interchangeably with "transform block" herein.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26. In some implementations the transform and quantization operations are implemented in a single operation, but they will be discussed separately in the present description for clarity. It will be understood that some implementations of the present application may combine the transform and quantization operations (or the corresponding inverse transform and dequantization operations).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction operation, the encoder creates a predicted block or unit based on the data of nearby pixels. There are various modes or directions for prediction. In some cases rate-distortion optimization may be used to select a mode/direction. The nearby pixels used in the prediction operation are reconstructed pixels that have been previously encoded and decoded within the feedback loop. The difference between the actual pixel data for the block and the predicted block is a residual block, i.e. an error signal. The residual data is transformed, quantized and encoded for transmission in the bitstream 14.

Inter-coded frames/blocks rely upon temporal prediction, i.e. they are predicted using reconstructed data from other frames/pictures. The encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. In other words, a motion vector search is carried out to identify a block within another frame/picture. That block is the source of the predicted block or unit. The difference between the predicted block and the original block becomes the residual data that is then transformed, quantized and encoded.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously-decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate/reconstruct the residual pixel-domain data. The spatial compensator 57 generates the video data from the residual data and a predicted block that it creates using spatial prediction. The spatial prediction applies the same prediction mode/direction as was used by the encoder in reliance upon previously-reconstructed pixel data from the same frame. Inter-coded blocks are reconstructed by creating the predicted block based on a previously-decoded frame/picture and the motion vector decoded from the bitstream. The reconstructed residual data is then added to the predicted block to generate the reconstructed pixel data. Both spatial and motion compensation may be referred to herein as "prediction operations".

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

In HEVC and some other coding standards, the picture is divided in a non-overlapping set of blocks. In HEVC, for example, each picture is divided into 64×64 coding tree blocks (CTB) (sometimes referred to as "coding tree units"). Each CTB may then be further divided in a quad-tree structured division into coding-tree nodes and, eventually, coding units. Note that in this structure the "leaf nodes", i.e. the coding units (CUs), are not necessarily all the same size. As an example, a CTB may be divided into 32×32 blocks, two of which may be CUs (leaf nodes) and two of which may be further divided into 16×16 blocks. Some of these may be CUs and some may be yet further divided into 8×8 blocks, etc.

Figure 3:
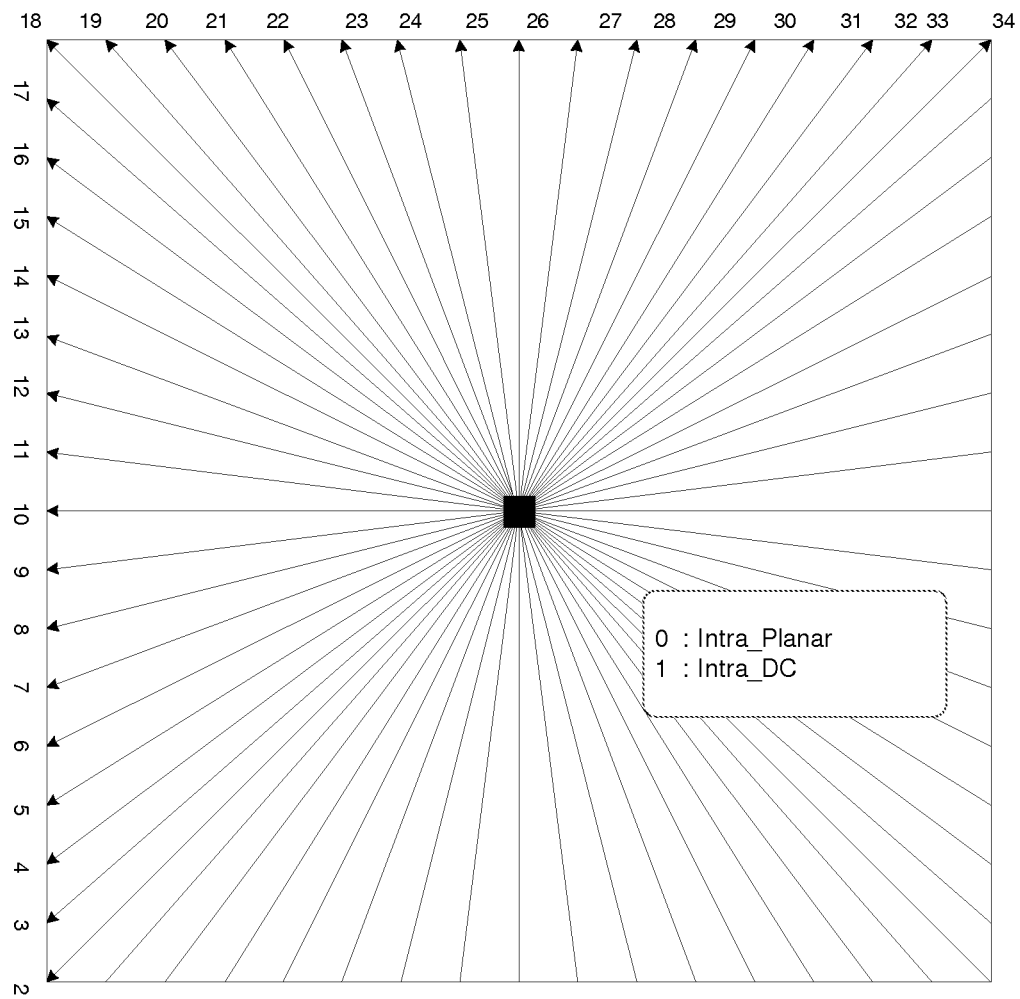
FIG. 3 shows one example of a set of intra-coding modes.

Reference is now made to FIG. 3, which diagrammatically illustrates the 35 intra-coding modes available in HEVC/H.265. Planar mode has ID 0 and DC mode has ID 1. The 33 angular modes are illustrated in the diagram with the labels ranging from ID 2 to ID 35.

When a block of samples is intra-coded, the prediction block is generated using up to 4N+1 neighbouring reconstructed samples from within the same picture. The intra-coding mode selected determines which of the neighbouring samples is used and what function is used to generate the predicted samples of the prediction block. A rate-distortion optimization (RDO) analysis may be used to select the intra-coding mode. RDO typically takes the form:

$$J=D+\lambda R$$

In this expression, J is the RDO cost being minimized, D is a measure of distortion, R is a rate measurement that reflects the number of bits required to send the encoded data, and $\lambda$ is a Lagrangian multiplier that reflects the relative trade-off between distortion and rate.

Distortion arises because quantization of the transformed residual results in data loss. Quantization, in general, is the mapping of a range of data values to a reduced range of values. In some coding schemes, a parameter, like the quantization parameter QP, is selected for a sequence, picture, frame, slice, etc. and all values are quantized using the quantization step size corresponding to that parameter. In some other coding schemes, the quantization parameter may vary depending on the coefficient position in a transform block, e.g. in frequency-dependent quantization (FDQ). In FDQ, the quantization steps size depends on the frequency associated with the transform domain coefficient, i.e. on its position within the block of transform domain coefficients. FDQ may be implemented using a fixed matrix of quantization steps sizes corresponding in size to the block being quantized.

In many cases, distortion is measured by comparing the original pixels to the reconstructed pixels. For example, distortion may be measured using peak signal-to-noise ratio (PSNR), which is based on the mean-squared error between the original and reconstructed pixels. While PSNR is straightforward to calculate, it does not accurately model the human visual system's perception of quality.

Alternative measurements of distortion that more closely model human visual perception have been developed, such as structural similarity (SSIM) measurements. In the spatial domain, the SSIM between two signals x and y over a common window of size N may be given by:

$$SSIM(x, y) = \frac{(2\mu_x \mu_y + C_1)(2\sigma_{xy} + C_2)}{(\mu_x^2 + \mu_y^2 + C_1)(\sigma_x^2 + \sigma_y^2 + C_2)}$$

In this expression, $\mu_x$ is the mean of x, $\mu_y$ is the mean of y, $\sigma_x^2$ is the variance of x, $\sigma_y^2$ is the variance of y, $\sigma_{xy}$ is the co-variance of x and y, and $C_1$ and $C_2$ are constants. This can also be expressed in DCT form:

$$SSIM(X, Y) = \left[\frac{2\frac{X(0)Y(0)}{N} + C_1}{\frac{X(0)^2 Y(0)^2}{N} + C_1}\right] \times \left[\frac{2\frac{\sum_{k=1}^{N-1} X(k)Y(k)}{N-1} + C_2}{\frac{\sum_{k=1}^{N-1} X(k)^2 Y(k)^2}{N} + C_2}\right]$$

In this expression, X and Y are the DCTs of x and y, respectively.

SSIM-based analysis has inspired at least one coding scheme that attempts to modify the quantization of the coefficients of a transform block. In essence, the SSIM of a transform block is estimated or modelled using its corresponding prediction block. Based on the SSIM statistics of the prediction block, the quantization step size for the block is normalized. The normal scalar quantizer is modified by a normalization factor, f, to result in:

$$u = \text{sign}(c)\left[\frac{|c|}{q \cdot f} + \theta\right]$$

In this expression, c is a transform domain coefficient, u is the quantized transform domain coefficient (sometimes referred to as an index), q is the quantization step size used for that transform block, f is the normalization factor, and $\theta$ is a rounding offset. At a decoder, the decoded u is multiplied by the normalization factor f and the quantization step size q to produce a reconstructed transform domain coefficient.

There may be different normalization factors for DC and AC coefficients, given the different terms of the SSIM expression that relate to DC and AC, respectively.

In one example, the prediction block is partitioned into 4×4 blocks referred to as sub-transform blocks (sub-TBs). The k-th transform coefficient in the i-th 4×4 sub-TB of a prediction block z is denoted $Z_i(k)$. The DC normalization factor may then be computed as:

$$f_{dc} = \frac{\frac{1}{l}\sum_{i=1}^{l} \sqrt{2Z_i(0)^2 + NC_1}}{E\left[\sqrt{2Z(0)^2 + NC_1}\right]}$$

In this expression, l denotes the sub-TBs in the transform block (16 in an example in which the TB is 16×16 and the sub-TBs are 4×4). E[.] is the expectation value over a picture. The AC normalization factor may be computed as:

$$f_{ac} = \frac{\frac{1}{l}\sum_{i=1}^{l} \sqrt{\frac{\sum_{k=1}^{15} Z_i(k)^2 + s \cdot Z_i(k)^2}{15} + C_2}}{E\left[\sqrt{\frac{\sum_{k=1}^{15} Z_i(k)^2 + s \cdot Z_i(k)^2}{15} + C_2}\right]}$$

In the above expression, s is a compensation factor for the effect of quantization on the AC components and may be calculated as:

$$s = 1 + 0.005q$$

The normalization factors $f_{dc}$ and $f_{ac}$ may be clipped to be within certain limits, which may be based upon the standard deviation of a histogram of the energy values of local 4×4 sub-TBs.

The normalization factors are derived from SSIM and assign a relative perceptual importance to each transform domain coefficient. For example, if f is large, the sub-TB containing the transform domain coefficient has a high degree of "activity", and can tolerate greater loss of information without being noticeable to the human eye. Therefore, it is less perceptually important and could be quantized more aggressively. On the other hand, if f is small, the transform coefficient is in a sub-TB that is perceptually important and as such, should be quantized less aggressively to preserve more noticeable details.

The main drawback of this solution is its high complexity, particularly at the decoder. The calculation of $f_{dc}$ and $f_{ac}$ require two iterations over every sample or transform coefficient of the prediction signal. Moreover, expensive multiplication, division and square root operations are required. Another drawback is that the solution applies the same normalization factor to every AC component in the same transform block, based on the assumption that the local statistics within each block do not vary significantly. Experiments indicate that this not necessarily the case; local statistics can indeed vary significantly.

In accordance with one aspect of the present application, quantization is adjusted or tuned on the basis of information available to both the encoder and decoder. In some cases, the information may be correlated to perceptual quality so that the quantization adjustments are based on perceptual quality. To avoid the computational burden of SSIM calculations, the information may not be obtained using actual SSIM calculations. In other cases, the information may be correlated with objective quality measurements, like PSNR.

In accordance with one aspect of the present application, the quantization tuning is applied to intra-coded blocks and is based, at least in part, upon the intra-coding mode (i.e.

direction). In accordance with another aspect of the present application, the quantization tuning is based, at least in part, upon the transform block size. Advantageously, the encoder already performs rate-distortion analysis in the course of selecting the intra-coding mode and the transform block size. Accordingly, implicit within that decision is a correlation between the selected block size and intra-coding mode and the statistical characteristics of the block being coded. Thus the selected intra-coding mode and block size have a relationship to the degree of "activity" in the block, e.g. the structural similarity of the block.

It should be noted that although the present application describes embodiments based around, or influenced by, the use of structural similarity, another sufficient statistic may be used for estimating the level of activity in a block. Examples of sufficient statistics include sample mean, sample variance, or derived rank information. In some cases, one or more of these other statistics may be used instead of or in conjunction with the techniques described herein for determining activity levels and tuning quantization accordingly.

In one embodiment, an "activity rank" is determined for the block on the basis of the intra-coding mode and block size. The activity rank may be a predetermined value that the encoder and decoder identify using a look-up table indexed by intra-coding mode and block size. The predetermined value may be empirically based. In the embodiments described below, the relative differences in the predetermined activity ranks matter more than their absolute values since they are normalized by an average activity rank.

In one embodiment, the quantizer normalization factors $f_{ac}$ and $f_{dc}$ are determined based on an activity rank associated with the block size and intra-coding mode. For example, the normalization factor $f_{ac}$ may be calculated as:

$$f_{ac} = \frac{r(m, b)}{\bar{r}}$$

In the above expression, m is the prediction mode, b is the transform block size, and r(m, b) denotes the predetermined activity rank corresponding to the prediction mode and transform block size. The activity rank may be referred to as a "rank" in some instances. The symbol $\bar{r}$ denotes an average activity rank, i.e. an average "rank". The average may be over a picture, or a number of blocks equivalent to a picture, or some other set of blocks. It may be a weighted average, such as over a number of pictures or slices. In one embodiment, $\bar{r}$ may be given by:

$$\bar{r} = \frac{1}{N} \sum_m \sum_b n(m, b) \times r(m, b)$$

In the above, averaging expression, N is the number of transform blocks in the picture or other set of data over which the average is being taken, and n(m, b) denotes the number of transform blocks in N for which the prediction mode is m and the transform block size is b.

In some instances, the average activity rank $\bar{r}$ is calculated as a running average starting from the first block in a picture, such that N varies as the number of processed blocks progressively increase during encoding/decoding. In another example, the average activity rank $\bar{r}$ may be the average calculated for the previous picture/frame/slice/etc. In yet another example, the average activity rank $\bar{r}$ used is the average of all activity ranks for the current picture, which implies that the encoder determines the activity values for all blocks before completing the encoding process, thereby delaying the encoding. In such an embodiment, the encoder may signal the average activity rank $\bar{r}$ value in the bitstream. The average activity rank $\bar{r}$ for each picture may be differentially coded with respect to the average activity rank $\bar{r}$ of the previous picture.

The predetermined activity ranks r (m, b) may be determined offline using a set of training sequences (in one example, the HEVC test sequences). The values may be determined by calculating an expression such as:

$$\sum_{i=1}^{t} \sqrt{\frac{\sum_{k=1}^{15} Z_i(k)^2 + s \cdot Z_i(k)^2}{15}} + C_2$$

In the above expression, the average may be calculated for each combination of mode m and block size b over a range of QP (such as, for example, the standard QP operating points of 22, 27, 32, and 37).

One specific example set of activity ranks is given below:
{13.376960, 9.050953, 8.053717},
{8.600049, 7.964858, 7.686175},
{27.570450, 16.028320, 10.691280},
{20.134490, 12.105310, 8.881446},
{24.218700, 13.764750, 9.341464},
{25.929390, 13.537290, 9.181718},
{25.628990, 13.018660, 9.152835}

In this specific example, the intra-coding modes are grouped into seven modes. The seven groupings in this example include (1) planar mode, (2) DC mode, (3) horizontal and vertical modes 8-12 and 24-28, (4) modes 2-4 and 32-34, (5) modes 5-7 and 29-31, (6) modes 13-15 and 21-23, and (7) modes 16-20. Different groupings may be used in different embodiments, including different numbers of groupings. It will be understood that the intent of the groupings is to group together modes that correlate to similar data statistics.

It will be appreciated that the nominal activity ranks are not as important as the relative values within a set. The activity rank is normalized by the average activity rank when computing $f_{ac}$. Consequently, scaling all the activity ranks in a set by a fixed scalar will give a new set of activity ranks, but will have no impact on the computation of $f_{ac}$.

Other example sets of activity ranks may be realized by changing the QP, training sequences, and/or averaging operation (for example, using a weighted average). In one example, a different set of training sequences provides the following specific example set of activity ranks:
{13.2860, 9.0327, 8.1373},
{8.5606, 7.9525, 7.7129},
{27.4026, 16.1220, 10.9107},
{20.0753, 11.9975, 9.1377},
{24.1317, 13.7209, 9.6213},
{25.7574, 13.4846, 9.3864},
{25.4551, 13.0274, 9.3814}

Since the set of activity rank may be determined offline, both the original and distorted transform blocks are available for analysis. Accordingly, in some implementations the set of activity ranks may be calculated based on an expression such as:

$$\sum_{i=1}^{l} \sqrt{\frac{\sum_{k=1}^{15} X_i(k)^2 + Y_i(k)^2}{15}} + C_2$$

In this expression, X and Y are the DCTs of x and y, respectively, as with the example SSIM expressions described above. In particular, $X_i(k)$ is the k-th DCT coefficient of the i-th sub-TB of the original transform block and $Y_i(k)$ is the k-th DCT coefficient of the i-th sub-TB of the distorted transform block (i.e. after encoding). In other embodiments, statistics derived from other perceptual quality metrics may be used in place of SSIM-based expressions.

A different look-up table of activity ranks may be provided for the DC normalization factor $f_{dc}$.

The blocks sizes in this example are 4×4, 8×8 and 16×16 or larger. In other examples, different block sizes may be used, or additional block sizes, like 32×32, added. In yet other examples, some blocks sizes may be grouped together. In one example, all block sizes are grouped thereby effectively making the activity rank independent of block size. The block sizes index the column of the above example activity ranks, whereas the coding mode indexes the row. For example, coding mode 10 and block size 8×8 results in a activity rank of 16.028320.

In some embodiments, upper and lower limits may be set for the normalization values $f_{dc}$ and $f_{ac}$. The upper and lower limits may be preconfigured limits set in the encoder and decoder in some embodiments. In other embodiments, the encoder may signal these limits to the decoder in the bitstream. The limits may be set for a video, a picture, a sequence of pictures, etc.

In one example embodiment, the encoder and decoder may calculate $f_{dc}$ using the SSIM-expression described above and may calculate $f_{ac}$ using rank values.

In some example embodiments, the encoder may be configured to override the calculated $f_{dc}$ and/or $f_{ac}$ normalization factors or activity ranks. The override values may be encoded and sent to the decoder. In some cases, the differential between the override value and the calculated value may be encoded and sent. The encoder may scale up the value and for encoding and transmission. Among the parameters that may be overridden are the activity rank for a particular sub-block, block or set of blocks, the normalization factors for a particular sub-block, block or set of blocks, and upper or lower limits on the calculated normalization factors.

In one example embodiment, the encoder may be configured to run the above-described SSIM calculation using transform coefficient data to obtain SSIM-based normalization factors denoted $f_{dc}'$ and $f_{ac}'$, where the prime symbol indicates that the calculations are based on an SSIM-type expression using actual coefficient data instead of the predetermined activity/rank data. If an SSIM-based normalization factors differs from the activity-value-based normalization factor by more than a threshold amount, then the encoder use the SSIM-based normalization factor. In such a case, the encoder may signal the difference in the factors to the decoder so that the decoder modifies its activity-value-based normalization factor.

Figure 4:
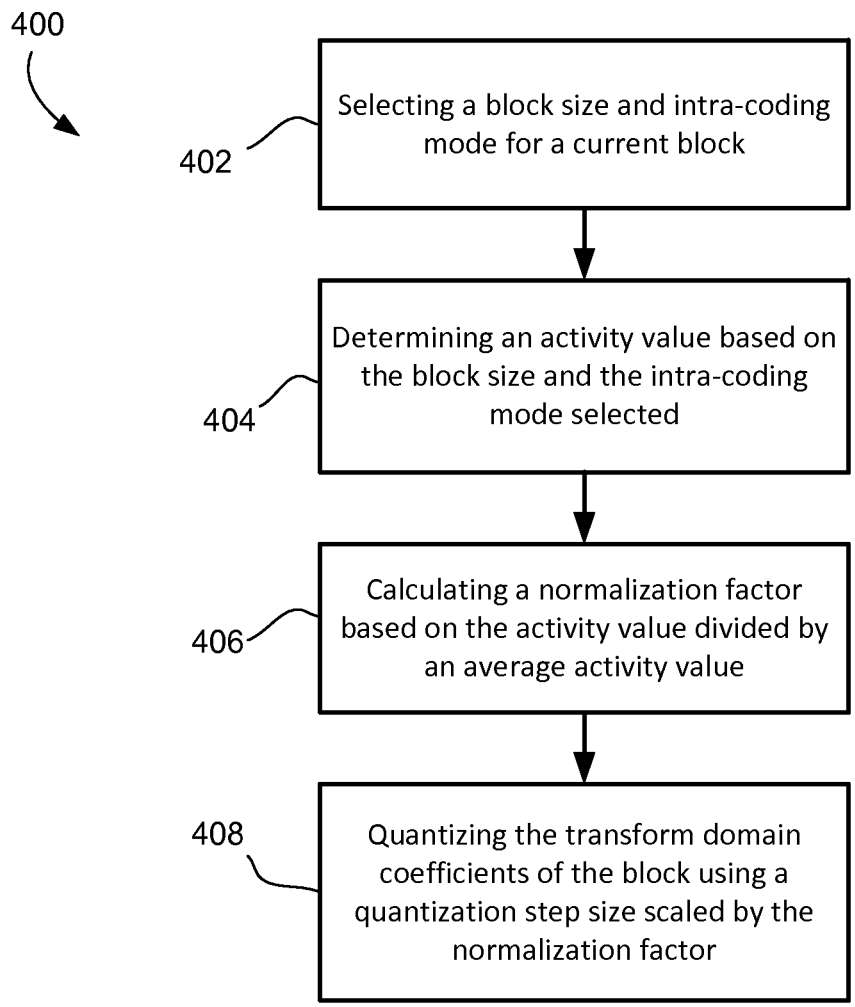
FIG. 4 shows, in flowchart form, a process for encoding video using intra-coding mode-dependent quantization tuning.

Reference is now made to FIG. 4, which shows, in flowchart form, an example method 400 for encoding a block of transform domain coefficients. The method 400 includes selecting a block size and an intra-coding mode for the current block (or sub-block, as will be described below) in operation 402. The block size selection and intra-coding mode selection may be based upon evaluating the options available and selecting one based on minimization of a rate-distortion expression.

In operation 404, an activity rank for the current block is determined based upon the block size and the intra-coding mode. In particular, the block size and intra-coding mode index a set or look-up table of predetermined activity ranks stored in memory at the encoder. The activity ranks may be pre-calculated based upon empirical studies regarding the correlation between relative SSIM-measured 'activity' in blocks and the block size and intra-coding mode of such blocks.

In operation 406, the encoder calculates a normalization factor, such as $f_{ac}$, based on the activity rank divided by an average activity rank. In some embodiments, the average activity rank is the average of activity ranks for the blocks encoded thus far for the current picture. In some embodiments, the average activity rank is the average of the activity ranks determined for the N preceding blocks in the encoding process. In yet other embodiments, the average activity rank is the average activity rank of the preceding picture. In some embodiments, any of the above average activity rank calculations may include a weighted average in which blocks closer in proximity to the current block have their associated activity ranks weighted more heavily in the averaging expression than blocks further away from the current block.

In operation 408, the calculated normalization factor from operation 406 is used during the quantization of the transform domain coefficients of the current block. For example, the quantization step size may be scaled by the normalization factor, such as in the expression:

$$u = \text{sign}(c)\left[\frac{|c|}{q \cdot f} + \theta\right]$$

Subsequent to the quantization of operation 408, the encoding process includes entropy encoding the quantized transform domain coefficients. The feedback loop of the encoder also includes the reconstruction of the pixel data of the picture (including the current block) in a process that mirrors operation of the decoder.

It will be appreciated that the rate-distortion optimization process employed at the encoder for the selection of intra-coding mode and/or block size may be modified to take into account the impact of normalization. One example distortion expression that incorporates normalization factors is as follow:

$$D(c, \hat{c}) = \sum_{i=1}^{l} \frac{\left(C_i(0) - \hat{C}_i(0)\right)^2}{f_{dc}^2} + \frac{\sum_{k=1}^{15}\left(C_i(k) - \hat{C}_i(k)\right)^2}{f_{ac}^2}$$

Figure 5:
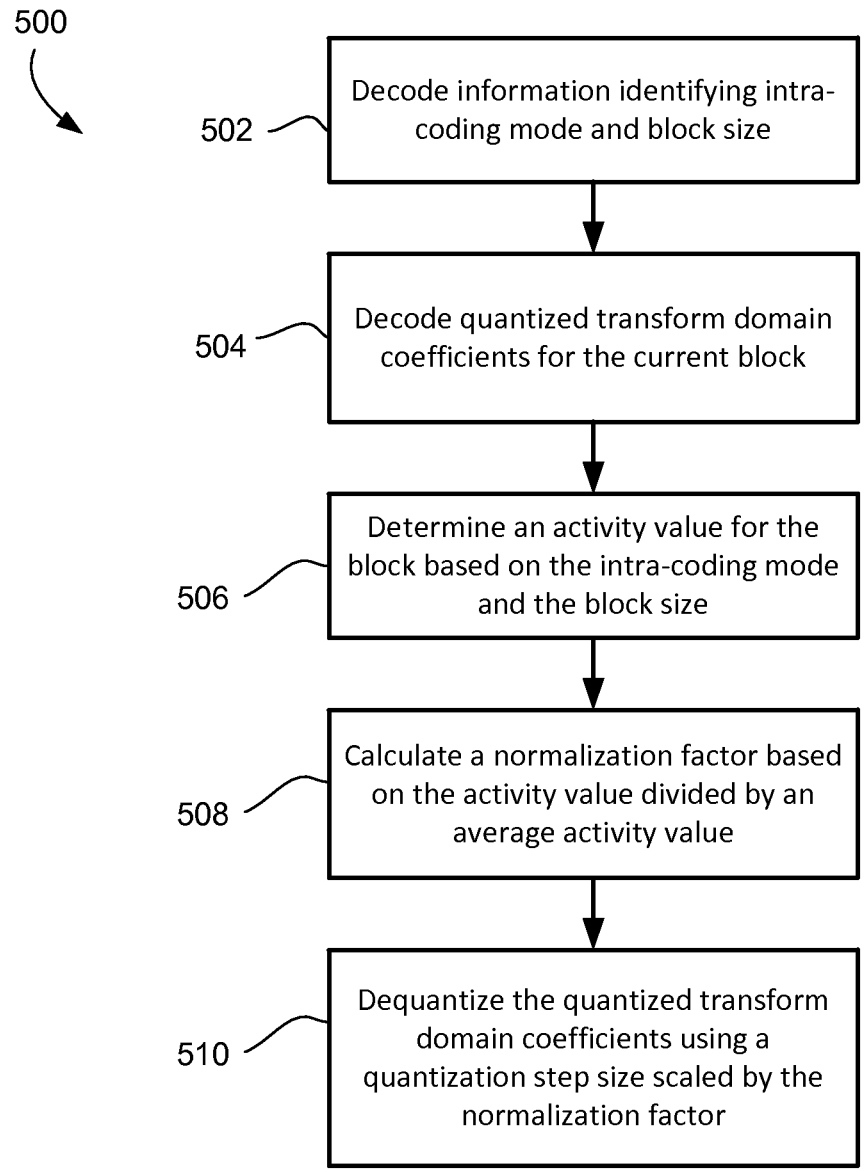
FIG. 5 shows, in flowchart form, a process for decoding video using intra-coding mode-dependent quantization tuning.

One example embodiment of a decoding process 500 will now be described with reference to the sample flowchart shown in FIG. 5. Some or all of the process 500 may be implemented by a decoder, such as a video decoder, or within the feedback loop of an encoder. The process 500 is applied to decode and reconstruct a picture, where the picture is partitioned into blocks (or sub-blocks). The description below illustrates application of the process to the reconstruction of one of the blocks, which may be referred to as a current block.

In operation 502, information identifying the intra-coding mode and block size for the current block is decoded. In some instances, this may include inferring the intra-coding mode and/or block size based upon settings for the slice/picture/frame. In some instances, this may include decoding the information from a bitstream of encoded data.

In operation 504, the quantized transform domain coefficients (sometimes called "indices" or "levels") for the current block are decoded from the bitstream. The decoding operation may include entropy decoding the indices using a context adaptive coding scheme, such as CABAC or CAVLC.

An activity rank for the current block is determined in operation 506. In particular, the block size and intra-coding mode determined in operation 502 is used to look-up a corresponding activity rank for a set or table of predetermined activity ranks stored in memory. That is, the activity rank is determined based solely on the block size and intra-coding mode. In some embodiments, the activity rank may be identified based solely on the intra-coding mode, or solely based on the block size. It will also be appreciated that in some embodiments, intra-coding modes may be grouped such that similar modes result in the same activity rank, as described above.

Once the activity rank for the current block is determined, then in operation 508 a normalization factor is calculated based, at least partly, on the activity rank divided by an average activity rank. In some embodiments, the average activity rank is the average of activity ranks for the blocks encoded thus far for the current picture. In some embodiments, the average activity rank is the average of the activity ranks determined for the N preceding blocks in the encoding process. In yet other embodiments, the average activity rank is the average activity rank of the preceding picture. In some embodiments, any of the above average activity rank calculations may include a weighted average in which blocks closer in proximity to the current block have their associated activity ranks weighted more heavily in the averaging expression than blocks further away from the current block. In yet other embodiments, the average activity rank for use with the current picture may be a value that the decoder decodes from the bitstream. In such a case, the average activity rank for the picture may be decoded from the picture/slice/frame header.

It will be understood that the order of operations 502, 504, 506 and 508 in some implementations may be different from the above description. For example, operation 504 may occur first, or after operation 508, or between operations 506 and 508.

In operation 510, the decoded quantized transform domain coefficients are used to reconstruct the pixel values. This includes dequantizing and inverse transforming the quantized transform domain coefficients. In some embodiments, the dequantization and inverse transformation operations are combined into a unified mathematical manipulation; in other embodiments, the dequantization is applied to the block first and the inverse transformation of the coefficients is applied afterwards. In operation 510, the dequantization operation includes scaling the quantization step size by the normalization factor. The reconstructed dequantized transform domain coefficients are generally given by:

$$\hat{c} = sign(c) \cdot |u| \cdot q \cdot f$$

Figure 6:
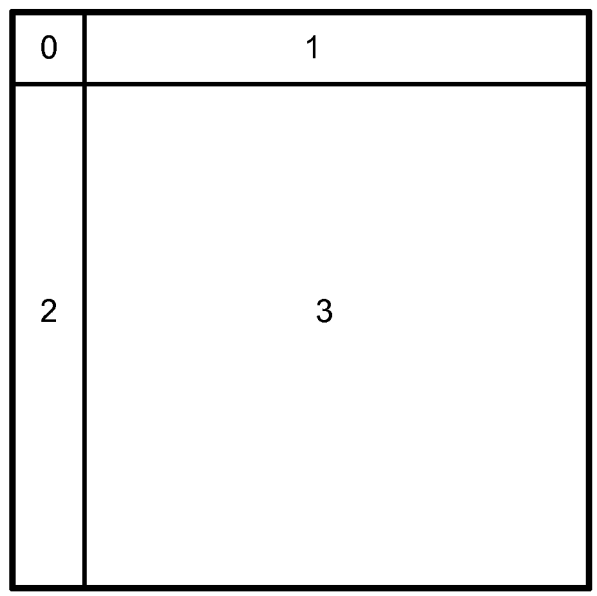
FIG. 6 shows an example partitioning of a transform block into regions.

The mode-dependent quantization tuning described above is applied to transform blocks. In some embodiments, it may be applied at a sub-block level, i.e. tailored to different regions in a partitioned transform block. Reference is now made to FIG. 6, which shows one example transform block 600 partitioned into regions. In this example, the block 600 is partitioned into four regions: region 0 for the DC coefficient, region 1 for the top row of coefficients excluding the DC coefficient, region 2 for the left column of coefficients excluding the DC coefficient, and region 3 for the remaining coefficients. The regions in this example are not uniform in size or configuration, although in at least one example the partitioning could result in equal-sized regions.

Each region may be assigned an activity rank that is based upon the intra-coding mode and block size of the whole transform block. The activity rank of a region estimates the relative perceptual importance of that region in the transform block and is used to calculate a region-specific normalization factor. The same symmetry of prediction mode statistics across coding modes at the block level does not apply at the region/sub-block level, meaning that a different grouping of intra-coding modes may be formed for determining activity ranks. As an example, intra-coding modes 10 and 26 will result in very different statistics in region 1. However, intra-coding mode 10 will result in a region 1 that has similar statistics to region 2 when using intra-coding mode 26.

In one embodiment, the activity ranks for regions 1, 2 and 3 are used separately to calculate AC normalization factors $f_1$, $f_2$, and $f_3$, for use in tuning quantization in those respective regions. The calculation of the region-specific normalization factors $f_1$, $f_2$, and $f_3$, may rely upon a block average activity rank $\bar{r}$. In some embodiments, region-specific average activity ranks may be used.

In another embodiment, the activity rank for the block is determined and the normalization factor $f_{ac}$ is determined as described above. The region-specific normalization factors $f_1$ and $f_2$ for use in regions 1 and 2, respectively, are then determined based upon a predetermined relationship between region 1 and region 2. Region 3 may use the block-level normalization factor $f_{ac}$. The region-specific normalization factors $f_1$ and $f_2$ may, in one embodiment, be determined in accordance with:

$$\frac{f_1 + f_2}{2} = f_{ac}$$

$$f_1 = \alpha(m, b) \times f_2$$

In this expression, m is the prediction mode, b is the block size, and α(m, b) is a multiplier that described the relationship between $f_1$ and $f_2$. In another embodiment, the relationship between $f_1$ and $f_2$ is a more general linear function, such as:

$$f_1 = \alpha(m,b) \times f_2 + \beta(m,b)$$

The normalization factors $f_{ac}$, $f_{dc}$, $f_1$ and $f_2$ may be clipped.

The use of mode-dependent quantization tuning may be signaled to the decoder in the bitstream. In one example, a binary flag, here referred to as mdq_info_present, indicates whether quantization tuning parameters are present in the sequence parameter set (SPS), picture parameter set (PPS), slice header and/or CU level to override any of the default parameters. For example, if mdq_info_present=0, then the default parameters are used.

In this example, if mdq_info_present=1, then there are $m_B \times b_B$ fixed-length integers present, corresponding to the activity ranks for block-level quantization tuning, where $m_B$ is the number of prediction mode groups and $b_B$ is the number of block size groups. For example, in one embodiment, $m_B \times b_B = 7 \times 3 = 21$. Each activity rank may be scaled by a prescribed integer and signaled as a fixed-length integer. In another embodiment, only the first activity rank is signaled as its scaled representation and all following activity ranks are signaled as an offset or differential from the first. In this case, these subsequent activity ranks can be signaled using a shorter length integer and/or losslessly coded, for example using run-length coding or quantization matrix coding techniques.

In one example embodiment in which region-based normalization is implemented, then if mdq_info_present=1 there are $m_S \times b_S$ fixed-length integers present, corresponding to the α multipliers for sub-block level quantization tuning, where $m_S$ is the number of prediction mode groups and $b_S$ is the number of block size groups. For example, in one embodiment, $m_S \times b_S = 7 \times 3 = 21$. Each multiplier may be scaled by a prescribed integer and signaled as a fixed-length integer. In another embodiment, only the first multiplier is signaled as its scaled representation and all following multipliers are signaled as an offset from the first. In this case, these multipliers can be losslessly coded, for example using run-length coding or quantization matrix coding techniques.

In one embodiment, if mdq_info_present=1, then upper and lower limits on $f_{dc}$ and $f_{ac}$ are present in the bitstream. In one example, these parameters are given by the syntax elements:

*fdc*_upper_limit

*fdc*_lower_limit

*fac*_upper_limit

*fac*_lower_limit

These values may be scaled by a prescribed integer and signaled as fixed-length integers. For example, if the desired upper limit on $f_{dc}$ is 1.5 and the prescribed integer is 1024, then fdc_upper_limit=1536. In another embodiment, $f_{dc}$ and $f_{ac}$ have the same upper and lower limits, in which case only two syntax elements would be required:

In another embodiment, the upper and lower limits are signaled and interpreted as the number of standard deviations from the mean μ. In one such embodiment, only one syntax element f_num_dev would be signaled, and the upper and lower limits would be μ+f_num_dev×σ, and μ−f_num_dev×σ respectively.

In other embodiments, instead of global upper and lower limits, there are different limits depending on the mode, block size and/or subdivision level.

In other embodiments, instead of having a single binary flag mdq_info_present to indicate the presence of all MDQ parameters, up to three different binary flags are used to indicate the presence of block level MDQ parameters, sub-block level MDQ parameters, and upper/lower limits on the computed normalization factors.

In other embodiments, there are separate parameter sets for luma and chroma components.

Figure 7:
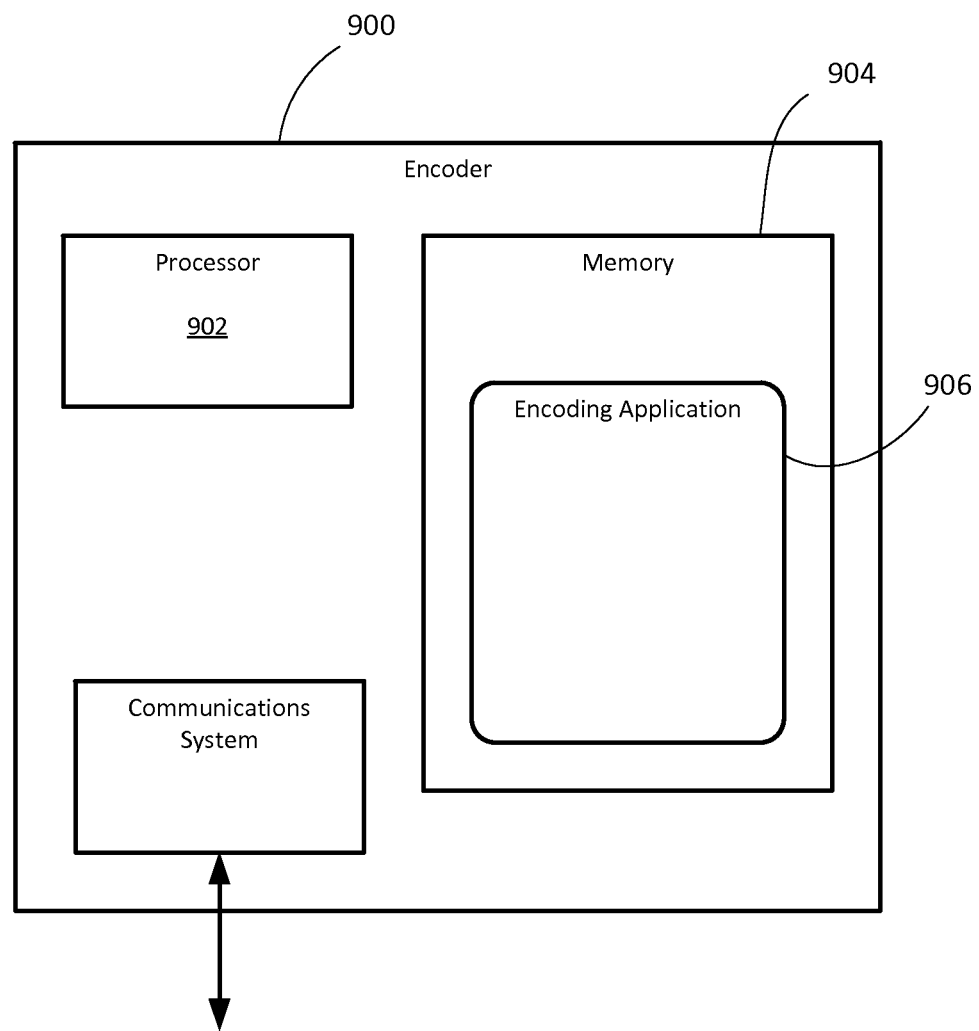
FIG. 7 shows a simplified block diagram of an example embodiment of an encoder.

Reference is now made to FIG. 7, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 8:
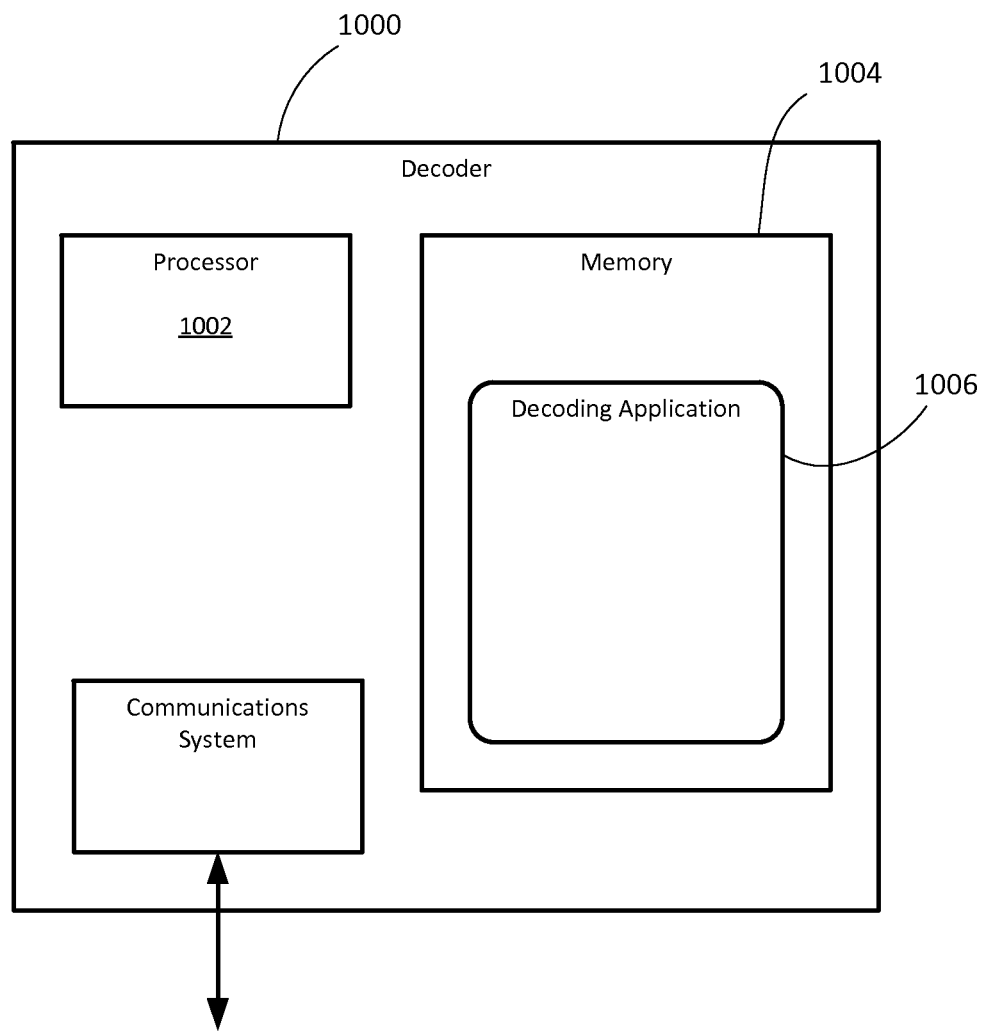
FIG. 8 shows a simplified block diagram of an example embodiment of a decoder.

Reference is now also made to FIG. 8, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding video from a bitstream of encoded video using a video decoder, the video including a picture partitioned into blocks, the method comprising:
    storing a look-up table of predetermined activity ranks each associated with a respective combination of a block size and intra-coding mode;
    selecting, from the look-up table of predetermined activity ranks, an activity rank for a block that was encoded using a selected one of a plurality of intra-coding modes, based on a block size of the block and the intra-coding mode that was used in encoding the block, wherein selecting includes indexing the look-up table using the block size and the intra-coding mode to read the associated activity rank;
    calculating a normalization value based on the activity rank divided by an average activity rank determined over a plurality of previously-decoded blocks; and
    dequantizing a set of decoded quantized coefficients for the block using a quantization step size adjusted by the normalization value.

2. The method claimed in claim 1, wherein the intra-coding modes are grouped into subsets and wherein each subset has an associated activity rank.

3. The method claimed in claim 1, wherein the average activity rank is an average activity rank calculated based on activity ranks for blocks of a previous picture.

4. The method claimed in claim 1, wherein the average activity rank is an average over a set of N blocks decoded immediately before the block.

5. The method claimed in claim 4, wherein N is the number of blocks in one of a picture and a slice.

6. The method claimed in claim 1, wherein dequantizing a set of decoded quantized coefficients for the block comprises dequantizing using the quantization step size scaled by the normalization value.

7. The method claimed in claim 1, wherein the normalization value comprises an AC normalization value and wherein dequantizing includes dequantizing AC quantized transform domain coefficients using the quantization step size adjusted by the AC normalization value.

8. The method claimed in claim 7, further including dequantizing a DC quantized transform domain coefficient using the quantization step size adjusted by a DC normalization value, and wherein the DC normalization value is calculated using a structural similarity measurement including DC coefficients of a plurality of blocks.

9. The method claimed in claim 1, wherein the block is partitioned into a plurality of regions, and wherein calculating a normalization value includes calculating an AC normalization value for use in at least one of the regions and calculating at least two regional normalization value for use in respective other regions.

10. The method claimed in claim 9, wherein calculating at least two regional normalization values comprises jointly solving a first equation relating the at least two regional normalization values to the AC normalization value and a second equation relating the at least two regional normalization values to each other.

11. A method of encoding video using a video encoder to produce a bitstream of encoded video, the video including a picture partitioned into blocks, the method comprising:
storing a look-up table of predetermined activity ranks each associated with a respective combination of a block size and intra-coding mode;
determining that a block is to be encoded using a selected one of a plurality of intra-coding modes;
selecting, from the look-up table of predetermined activity ranks, an activity rank for the block, based on a block size of the block and the selected intra-coding mode for the block, wherein selecting includes indexing the look-up table using the block size and the intra-coding mode to read the associated activity rank;
calculating a normalization value based on the activity rank divided by an average activity rank determined over a plurality of previously-encoded blocks; and
quantizing a set of transform domain coefficients for the block using a quantization step size adjusted by the normalization value.

12. The method claimed in claim 11, wherein the normalization value comprises an AC normalization value and wherein quantizing includes quantizing AC transform domain coefficients using the quantization step size adjusted by the AC normalization value.

13. The method claimed in claim 12, further including quantizing a DC transform domain coefficient using the quantization step size adjusted by a DC normalization value, and wherein the DC normalization value is calculated using a structural similarity measurement including DC coefficients of a plurality of blocks.

14. The method claimed in claim 11, wherein the block is partitioned into a plurality of regions, and wherein calculating a normalization value includes calculating an AC normalization value for use in at least one of the regions and calculating at least two regional normalization value for use in respective other regions.

15. The method claimed in claim 14, wherein calculating at least two regional normalization values comprises jointly solving a first equation relating the at least two regional normalization values to the AC normalization value and a second equation relating the at least two regional normalization values to each other.

16. A decoder for decoding a bitstream of encoded video, the decoder comprising:
a processor;
a memory storing a look-up table of predetermined activity ranks each associated with a respective combination of a block size and intra-coding mode; and
a decoding application stored in memory and containing instructions for causing the processor to
select, from the look-up table of predetermined activity ranks, an activity rank for a block that was encoded using a selected one of a plurality of intra-coding modes, based on a block size of the block and the intra-coding mode that was used in encoding the block, wherein selecting includes indexing the look-up table using the block size and the intra-coding mode to read the associated activity rank,
calculate a normalization value based on the activity rank divided by an average activity rank determined over a plurality of previously-decoded blocks, and
dequantize a set of decoded quantized coefficients for the block using a quantization step size adjusted by the normalization value.

17. An encoder for encoding video, the video including a picture partitioned into blocks, the encoder comprising:
a processor;
a memory storing a look-up table of predetermined activity ranks each associated with a respective combination of a block size and intra-coding mode; and
an encoding application stored in memory and containing instructions for causing the processor to
determine that a block is to be encoded using a selected one of a plurality of intra-coding modes,
select, from the look-up table of predetermined activity ranks, an activity rank for the block, based on a block size of the block and the selected intra-coding mode for the block, wherein selecting includes indexing the look-up table using the block size and the intra-coding mode to read the associated activity rank,
calculate a normalization value based on the activity rank divided by an average activity rank determined over a plurality of previously-encoded blocks, and
quantize a set of transform domain coefficients for the block using a quantization step size adjusted by the normalization value.

18. A non-transitory processor-readable medium storing a look-up table of predetermined activity ranks each associated with a respective combination of a block size and intra-coding mode, and storing processor-executable instructions which, when executed, cause one or more processors to perform the method of:
select, from the look-up table of predetermined activity ranks, an activity rank for a block that was encoded using a selected one of a plurality of intra-coding modes, based on a block size of the block and the intra-coding mode that was used in encoding the block, wherein selecting includes indexing the look-up table using the block size and the intra-coding mode to read the associated activity rank;

calculating a normalization value based on the activity rank divided by an average activity rank determined over a plurality of previously-decoded blocks; and dequantizing a set of decoded quantized coefficients for the block using a quantization step size adjusted by the normalization value.

\* \* \* \* \*